(12) United States Patent
Wyschogrod et al.

(10) Patent No.: US 9,003,518 B2
(45) Date of Patent: Apr. 7, 2015

(54) SYSTEMS AND METHODS FOR DETECTING COVERT DNS TUNNELS

(75) Inventors: Daniel Wyschogrod, Newton, MA (US); David Patrick Mankins, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1109 days.

(21) Appl. No.: 12/873,553

(22) Filed: Sep. 1, 2010

(65) Prior Publication Data

US 2012/0054860 A1 Mar. 1, 2012

(51) Int. Cl.
- *G06F 12/14* (2006.01)
- *H04L 29/06* (2006.01)
- *H04L 29/12* (2006.01)

(52) U.S. Cl.
CPC ...... *H04L 63/1416* (2013.01); *H04L 29/12066* (2013.01); *H04L 61/1511* (2013.01); *H04L 63/1441* (2013.01)

(58) Field of Classification Search
CPC ............ H04L 29/12066; H04L 29/12047; H04L 29/12009; H04L 29/12018; H04L 61/1511; H04L 61/15; H04L 61/10
USPC ................. 726/1, 22; 707/1, 5, 722
See application file for complete search history.

(56) References Cited

U.S. PATENT DOCUMENTS

| | | | |
|---|---|---|---|
| 7,003,555 B1 * | 2/2006 | Jungck | 709/219 |
| 2006/0112176 A1 * | 5/2006 | Liu et al. | 709/223 |
| 2006/0184500 A1 * | 8/2006 | Najork et al. | 707/1 |
| 2009/0164614 A1 * | 6/2009 | Christian et al. | 709/223 |
| 2009/0262741 A1 * | 10/2009 | Jungck et al. | 370/392 |
| 2009/0282033 A1 * | 11/2009 | Alshawi | 707/5 |
| 2010/0274836 A1 * | 10/2010 | Orentas et al. | 709/203 |
| 2010/0312875 A1 * | 12/2010 | Wilerson et al. | 709/224 |
| 2011/0040769 A1 * | 2/2011 | Tseng et al. | 707/750 |
| 2011/0093584 A1 * | 4/2011 | Qiu et al. | 709/224 |
| 2011/0185250 A1 * | 7/2011 | Huang et al. | 714/749 |
| 2012/0054860 A1 * | 3/2012 | Wyschogrod et al. | 726/22 |
| 2012/0110334 A1 * | 5/2012 | Rossi | 713/176 |
| 2012/0203904 A1 * | 8/2012 | Niemel et al. | 709/225 |
| 2012/0240185 A1 * | 9/2012 | Kapoor et al. | 726/1 |
| 2013/0191372 A1 * | 7/2013 | Lee et al. | 707/722 |
| 2013/0191416 A1 * | 7/2013 | Lee et al. | 707/771 |

OTHER PUBLICATIONS

NgViz: Detecting DNS Tunnels through N-Gram Visualization and Quantitative Analysis, Gustafson et al., Apr. 21, 2010.*

* cited by examiner

*Primary Examiner* — Thu Ha Nguyen
(74) *Attorney, Agent, or Firm* — Ropes & Gray LLP

(57) ABSTRACT

Systems and methods are disclosed for detecting covert DNS tunnels using n-grams. The majority of legitimate DNS requests originate from network content itself, for example, through hyperlinks in websites. So, comparing data from incoming network communications to a hostname included in a DNS request can give an indication on whether the DNS request is a legitimate request or associated with a covert DNS tunnel. This process can be made computationally efficient by extracting n-grams from incoming network content and storing the n-grams in an efficient data structure, such as a Bloom filter. The stored n-grams are compared with n-grams extracted from outgoing DNS requests. If n-grams from an outgoing DNS request are not found in the data structure, the domain associated with the DNS request is determined to be associated with a suspected covert DNS tunnel.

27 Claims, 4 Drawing Sheets

SYSTEMS AND METHODS FOR DETECTING COVERT DNS TUNNELS

GOVERNMENT CONTRACT

The U.S. Government has a paid-up license in this invention and the right in limited circumstances to require the patent owner to license others on reasonable terms as provided for by the terms of Contract No. N66001-08-C-2050 awarded by the Defense Advanced Research Project Agency (DARPA).

BACKGROUND OF THE DISCLOSURE

This application relates to the detection of covert DNS tunnels.

In recent years, hackers have increasingly utilized the Domain Name System (DNS) network protocol as a medium for a covert channel. Communications that would otherwise be disallowed by network firewalls or other security monitoring systems may be able to readily pass through a network undetected as a DNS communication. Further, the DNS protocol has significant room for user-defined data and supplementary text fields which may be utilized by a hacker to transmit covert information. Additionally, DNS servers are decentralized, making it easy to set up a DNS server that will function as the receiving end of covert DNS tunnels.

Some current systems have resorted to computationally intensive algorithms and machine learning techniques to attempt to uncover these covert DNS tunnels with limited success. Other systems have relied on visualization techniques to uncover covert DNS tunnels; however, these implementations require significant human input and analysis.

SUMMARY OF THE DISCLOSURE

To address the deficiencies of the prior art, the disclosure relates to the detection of covert DNS tunnels using n-grams. As noted above, current systems use computationally intensive algorithms or visualization techniques, which can require clean and accurate training data for a training period, require significant human input, and/or allow significant numbers of covert DNS tunnels to remain undetected. These problems can be mitigated with the use of n-grams that are based on incoming network traffic.

The majority of legitimate DNS requests originate from network content itself, for example, through hyperlinks in websites. Only a limited number of hostnames are supplied by the users themselves, for example, by typing the address of a well known website into their web-browsers. Conversely, covert DNS tunnel communications usually include unique hostnames that are derived from encoding schemes to encode clandestine messages. Thus, by comparing hostnames included in DNS requests to hostnames extracted from network content, it is possible to detect suspicious domains that may be associated with a covert DNS tunnel. This comparison may be done in a computationally efficient manner by using n-grams.

Methods, systems, and computer readable medium storing computer executable instructions for detecting covert DNS tunnels using n-grams are disclosed. A covert DNS tunnel detector may be implemented in a network's security system and/or in any other suitable device in the network. In some embodiments, the covert DNS tunnel detector includes a network scanner that is configured to scan incoming network traffic. The network scanner extracts n-grams from the scanned incoming network traffic. In some situations, the incoming network traffic is compressed. In such situations, the network scanner may uncompress the network traffic prior to extracting the n-grams.

Additionally, a DNS request inspector scans and extracts n-grams from outgoing DNS requests. A comparator compares the n-grams extracted from the outgoing DNS requests to n-grams extracted from the scanned incoming network traffic. A portion of a domain name associated with the outgoing DNS request is added to a table of suspicious domain names when at least a portion of the n-grams extracted from an outgoing DNS request does not match the n-grams extracted from the incoming network communications. In some embodiments, the portion of the n-grams that does not match is equal to a predetermined proportion of the n-grams extracted from the outgoing DNS request.

The domain name added to the table of suspicious domains may be determined to be associated with a covert DNS tunnel. Once the determination is made, an indication may be provided that indicates that the domain name is associated with a covert DNS tunnel. In some embodiments, further DNS requests that are associated with the domain name determined to be associated with a covert DNS tunnel are completely or substantially blocked from exiting the network and/or reaching the appropriate DNS server.

In some embodiments, a counter associated with the domain name added to the table of suspicious domains is incremented for respective DNS requests where at least a portion of the n-grams extracted from the respective DNS requests do not match the n-grams extracted from the incoming network traffic. An indication that the domain name associated with the counter is associated with a covert DNS tunnel is provided when the counter reaches or exceeds a threshold. In some embodiments, DNS requests associated with the domain name are completely and/or substantially blocked when the counter reaches or exceeds the threshold.

In some embodiments, the n-grams extracted from the incoming network traffic are associated with strings that match the syntax of hostnames. n-grams extracted from the incoming network communications that are associated with a string that matches the syntax of hostnames may be associated with a higher priority. For example, priorities may be utilized to make n-gram searches and/or comparisons more efficient. In some embodiments, the n-grams extracted from the incoming network communications are stored in a suitable data structure, such as, a data structure that utilizes hash coding or Bloom filters.

BRIEF DESCRIPTION OF THE DRAWINGS

The system and methods may be better understood from the following illustrative description with references to the following drawings in which.

DETAILED DESCRIPTION

To provide an overall understanding of the invention, certain illustrative embodiments will now be described, including systems and methods for detecting covert DNS tunnels using n-grams. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Herein an n-gram refers to a sequence of characters or any suitable sequence of phonemes, syllables, or words, where n may be any suitable integer. For example, when n equals 7, an individual n-gram may include 7 characters, phonemes, syllables, or words from source data depending on the type of information used to create the n-gram. In the embodiments described below, any reference to an n-gram refers to an n-gram that includes a sequence of characters.

Figure 1:
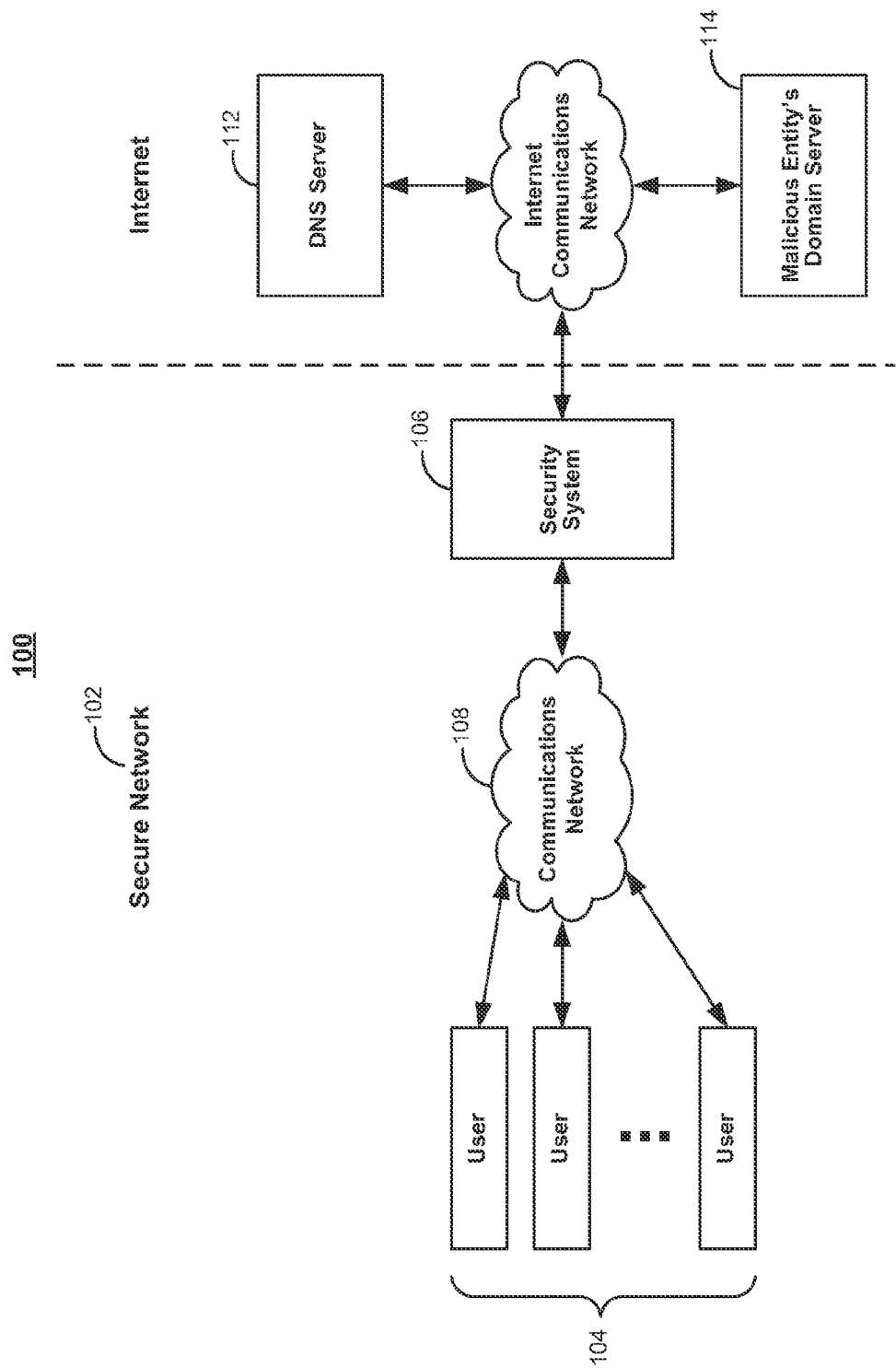
FIG. 1 is a block diagram of a network that includes a security system connected to the Internet, according to an illustrative embodiment.

FIG. 1 is a block diagram of network 100, which includes secure network 102 and the Internet. Secure network 102 includes users 104, security system 106, and communications network 108. As an illustrative embodiment, the Internet includes DNS server 112 and malicious entity's domain server 114.

Secure network 102 may be and/or include any suitable network, for example, a personal area network, local area network, home area network, campus network, wide area network, global area network, enterprise private network, public switched telephone network, the Internet, and/or any other suitable type of network. Users 104 are users of secure network 102 and/or may represent any suitable device in secure network 102. Users 104 may communicate with any suitable element in secure network 102 and/or any suitable element in the Internet via communications network 108, which may be any suitable network or combination of networks.

Security system 106 is generally responsible for blocking unauthorized messages entering and/or leaving network 102. Security system 106 may be any suitable type of security hardware and/or software, for example, a firewall. In an embodiment, all or most of the network communications entering or leaving network 102 pass through security system 106. For example, security system 106 may examine all incoming network traffic from the Internet. In some embodiments, security system 106 is equipped with software and/or hardware for detecting covert DNS tunnels using n-grams. Such embodiments are discussed below with regard to FIGS. 2-4.

DNS server 112 may be any suitable server that is generally responsible for providing mapping between IP addresses and hostnames. In one embodiment, DNS server 112 is capable of communicating with devices in secure network 102 and the Internet using the DNS protocol.

Malicious entity's domain server 114 is a server that is registered with DNS server 112 such that DNS requests for malicious entity's domain will be forwarded by DNS server 112 to malicious entity's domain server 114. For example, a malicious user may have infiltrated secure network 102 and wishes to transmit stolen information from secure network 102 to malicious entity's domain server 114. The malicious user may encode the stolen information into a form that meets the rules set by DNS protocol for naming hostnames. Then, the malicious user transmits the encoded stolen information from secure network 102 to DNS server 112 in the form of a valid DNS request. DNS server 112 then forwards the malicious user's DNS request to malicious entity's domain server 114, where the malicious user may decode the DNS request and retrieve the stolen information. Such nefarious communications may be detected by a covert DNS tunnel detector, as discussed below with regard to FIGS. 2-4.

Figure 2:
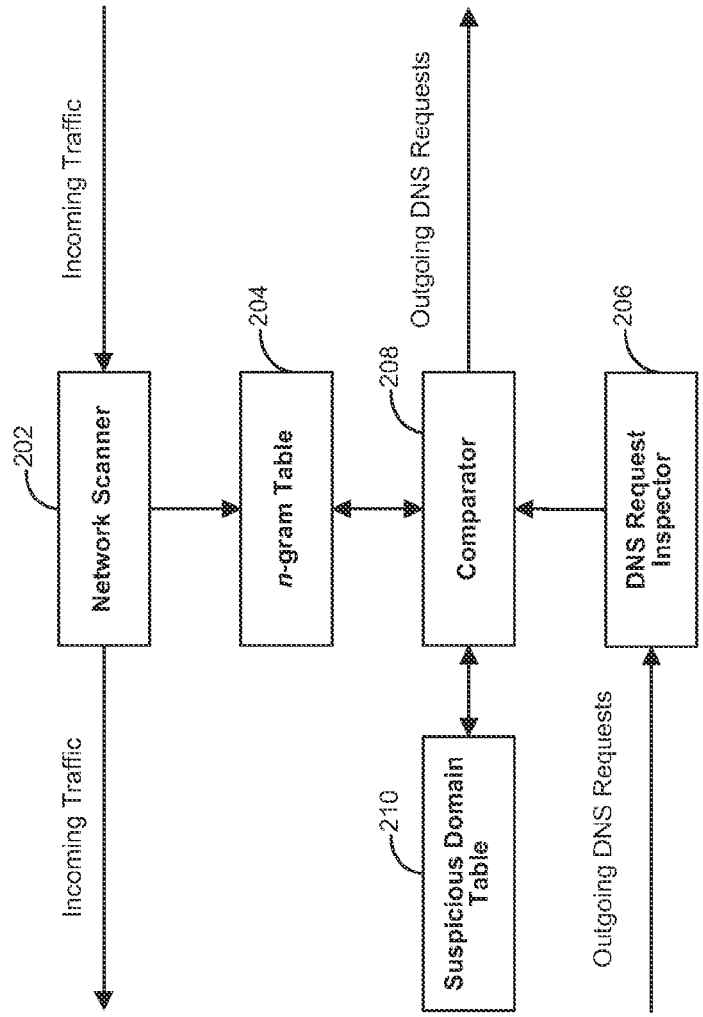
FIG. 2 is a block diagram of a covert DNS tunnel detector, according to an illustrative embodiment.

FIG. 2 is a block diagram of covert DNS tunnel detector 200 that detects covert DNS tunnels using n-grams. For example, covert DNS tunnel detector 200 may detect the malicious user's covert DNS communications that are described above with regard to FIG. 1. Covert DNS tunnel detector 200 includes network scanner 202, n-gram table 204, DNS request inspector 206, comparator 208, and suspicious domain table 210.

Network scanner 202 is generally configured to scan at least a portion of incoming network traffic, for example, traffic from the Internet going into secure network 102 of FIG. 1. In some embodiments, scanner 202 scans all of the incoming network traffic. Network scanner 202 extracts some or all of the scanned network traffic in the form of n-grams, where n is any suitable integer. The extracted n-gram records may be stored in n-gram table 204. After scanning and/or extracting the suitable information from the incoming network traffic, scanner 202 forwards the incoming network traffic to any suitable device within the network. In some embodiments, network scanner 202 runs in parallel with other network processes and/or devices, such as a network router. In such an embodiment, identical or substantially similar incoming network traffic is received by both network scanner 202 and the network router. In some embodiments, network scanner 202 may include a packet capture software and/or hardware to capture the incoming network traffic. Duplicating incoming network traffic and/or utilizing packet capturing techniques can allow covert DNS tunnel detector 200 to perform its functions without increasing or substantially increasing the network's latency. For example, network scanner 202 can scan the incoming network communications while the network router forwards the identical incoming network communications to the appropriate device in the network.

In some embodiments, network scanner 202 performs protocol-specific analysis of and/or transformations on the scanned input. For example, scanner 202 may determine that HTTP network traffic is in a compressed form. Upon making this determination, scanner 202 uncompresses the network traffic, scans the uncompressed form of the network traffic, and stores n-grams in n-gram table 204 based on the uncompressed form of the network traffic. In some embodiments, scanner 202 scans the underlying code of the network traffic. For example, the incoming network traffic may consist of an HTML based webpage. Network scanner 202 scans the HTML code associated with webpage to, for example, extract web addresses associated with hyperlinks in the webpage. As an additional example, scanner 202 may scan the underlying code of an embedded web application in a webpage, such as an Adobe Flash application. For example, scanner 202 may store web addresses associated with hyperlinks in an interactive Flash application.

In some embodiments, network scanner 202 scans and stores incoming network traffic on the basis of syntax. For example, scanner 202 may match the syntax of hostnames in the network traffic and only create and store n-grams based on detected hostnames. In some embodiments, n-grams associated with detected hostnames in the incoming network traffic are given a higher priority in n-gram table 204. In some embodiments, network scanner 202 only creates and stores n-grams based on strings that match legal hostnames and/or based on strings that include characters within a particular range or ranges of ASCII codes. For example, n-gram table 204 may create n-grams based on strings that only include English characters. In some embodiments, scanner 202 formats n-grams according to a canonical form. For example, scanner 202 may convert all the characters in the created n-grams to all lowercase before transmitting the n-grams to n-gram table 204 for storage. In some embodiments, n-gram table 204 returns an indication on whether an n-gram recently created by scanner 202 is already in n-gram table 204. n-gram table 204 may alternatively or additionally disregard duplicate n-grams.

In some embodiments, network scanner 202 determines that it should not attempt to scan a portion of the incoming network traffic because it would be too computationally intensive to do so or it would create too much irrelevant data in n-gram table 204. For example, scanner 202 may determine that a portion of the incoming network traffic is encrypted by parsing enough of the traffic to determine that the encrypted portion of the traffic is not plaintext. It would generally not be possible for scanner 202 to decrypt the encrypted data without an encryption key or computationally intensive decrypting algorithms. Scanner 202 could scan the encrypted data, but doing so would create a number of irrelevant n-grams for storage in n-gram table 204. As such, upon determining that a portion of the incoming network traffic includes encrypted data, scanner 202 may ignore the encrypted portion of the incoming network traffic and allow that traffic to pass through covert DNS tunnel detector 200 without being scanned. In some embodiments, scanner 202 will not scan particular data types that are included in the incoming network traffic because those particular data types generally do not include hostname information. For example, image data in a JPEG or GIF format generally does not include hostname information. As such, scanner 202 can ignore JPEG or GIF data that is included in incoming network traffic and allow the JPEG or GIF data to pass through covert DNS tunnel detector 200 without being scanned.

n-gram table 204 may be of any suitable memory structure that stores and/or organizes the n-grams received from network scanner 202. For example, table 204 entries may be organized according to any suitable indexing and/or hash function. In some embodiments, table 204 may be any suitable hash table, Bloom filter, trie, search tree, ordered tree, or any other structure that is capable of returning an indication of whether new n-grams have been seen before. For example, a suitable hash function implemented in table 204 may convert the n-grams received from scanner 202 to m number of entry numbers, where m is a number between 0 and B, and where B is the size of the memory in table 204. The entries of table 204 may be indexed in a manner such that the entries are spread uniformly over the range of numbers from 0 to B for different n-grams received from scanner 202. When table 204 receives an n-gram from comparator 208, as is described in greater detail below, n-gram table 204 will return an indication of whether the n-gram is stored in table 204 to comparator 204.

In some embodiments, n-gram table 204 is entirely or partially predetermined. For example, n-gram table 204 may add new entries received from network scanner 202 to a partial table of predetermined entries. In a first embodiment, the predetermined entries are based on n-grams gathered during a trial and/or experimental period, such as, n-grams gathered during experimental periods of operation run by the developers of covert DNS tunnel detector 200. As a further example, n-grams can be gathered by network scanner 202 during a trial period shortly after tunnel detector 200 is installed in a particular network. In a second embodiment, the predetermined entries are based on popular and/or most accessed hostnames. For example, the predetermined entries may be based on information regarding popular websites provided by an Internet activity monitoring organization, such as Alexa Internet, Inc. In a third embodiment, the predetermined entries are based on the location of the network that implements covert DNS tunnel detector 200. For example, the predetermined entries may be based on popular Chinese websites when covert DNS tunnel detector 200 is implemented in a network that primarily includes Chinese users. In a fourth embodiment, the predetermined entries are based on a category or categories of websites. For example, the predetermined entries may be based on visual arts websites when covert DNS tunnel detector 200 is implemented in an organization primarily focused on the visual arts. It should be noted that the predetermined entries of n-gram table 204 may include any suitable combination of the predetermined entries noted above or any other suitable predetermined entry without departing from the scope of this disclosure. n-gram table 204 may be implemented using any suitable form of memory, for example, random-access memory, read-only memory, flash memory, or any other suitable form of memory.

While a Bloom filter is a useful data structure for n-gram table 204, Bloom filters have a number of weaknesses. For example, it can be difficult to remove entries from a Bloom filter, and as such, the Bloom filter can reach maximum capacity relatively quickly. To address the weaknesses of Bloom filters, n-gram table 204 may maintain multiple n-gram tables. For example, table 204 may initiate multiple n-gram tables at staggered times and remove tables as the tables near capacity and/or at predetermined times. As a further example, table 204 can initially create a first n-gram table and begin creating n-gram entries based on received information from network scanner 202. At some suitable time later (e.g., fifteen minutes later), table 204 creates a second n-gram table. Then, the two n-gram tables create entries based on n-grams received from network scanner 202 simultaneously. This process of creating n-gram tables with overlapping entries may carry on indefinitely. In some embodiments, as a new overlapping n-gram table is created, one of the other overlapping n-gram tables is removed. For example, the oldest or the substantially oldest n-gram table is removed. In some embodiments, the removed n-gram tables are archived for later use. For example, the archived n-gram tables may be rotated back into n-gram table 204 and further updated based on received information from network scanner 202. As a further example, the archived n-gram tables may be used as predetermined n-gram tables in different implementations of covert DNS tunnel detector 200. While maintaining multiple n-gram tables in n-gram table 204 is useful for addressing the weaknesses of Bloom filters, multiple n-gram tables may be used with any other suitable data structure without departing from the scope of this disclosure.

In some embodiments, n-gram table 204 stores n-gram entries indefinitely. For example, n-gram table 204 may be ever expanding as more n-grams are continually extracted from incoming network communications. In such an example, n-gram table 204 can dynamically allocate memory for the n-gram entries as needed. In some embodiments, n-gram table 204 is periodically refreshed. For example, after some period of time or after a particular amount of information is stored in n-gram table 204, some or all of table 204 may be deleted. In some embodiments, older entries are replaced with new entries. For example, n-gram table 204 may be maintained at a fixed size. In such an embodiment, when a new entry is extracted from the incoming network communications, n-gram table 204 may replace the oldest entry and/or least commonly seen entry with the new entry. For example, n-gram table 204 may examine the existing entries to determine which entry is the oldest and/or least commonly seen. Once the oldest and/or least common entry is found, it may be replaced by the new entry. In some embodiments, entries in n-gram table 204 are associated with timestamps to aid determining the age of the entries and/or determining when the entries were last seen and/or updated by network scanner 202. In some embodiments, entries in n-gram table 204 are associated with counters in addition to or alternative to the timestamps, which may be used to determine the rarity of the entries. In some embodiments, the counters decay over time so that, for example, entries that originated from large, but short lived bursts are not incorrectly determined to be common. In some embodiments, the determined rarity of an entry is based on the frequency of the entry. For example, entries that are seen with a higher frequency may be determined to be common, while entries that are seen with a lesser frequency may be determined to be rare. In some embodiments, entries are deleted from n-gram table 204 randomly to make room for new entries.

DNS request inspector 206 is generally configured to scan at least a portion of the outgoing DNS requests. For example, inspector 206 inspects hostnames within DNS request that originate from users 104 of FIG. 1. In a preferred embodiment, inspector 206 extracts the hostnames from the DNS requests in the form of n-grams. In some embodiments, inspector 206 scans the DNS requests in substantially the same manner as network 202 scans incoming network traffic. For example, inspector 206 may create n-grams based on DNS request syntax such that only the hostnames are extracted. After creating n-grams based on the scanned DNS requests, inspector 206 passes the n-grams to comparator 208. In some embodiments, DNS request inspector 206 duplicates and forwards the DNS requests to the appropriate destination before performing the scanning operations to avoid increasing the latency of the network. In some embodiments, DNS request inspector 206 receives duplicate versions of the DNS requests, wherein the original DNS requests are forwarded to the appropriate destinations before or during the analysis DNS request inspector 206 performs on the duplicate DNS requests. This may also prevent increased latency in the network.

Comparator 208 is generally configured to compare n-grams created by DNS request inspector 206 to n-grams in n-gram table 204. For example, comparator 208 may send an inquiry to n-gram table 204 regarding n-grams created by DNS request inspector 206. In response, n-gram table 204 will send an indication to comparator 208 that indicates whether the n-gram is included in n-gram table 204. If the n-grams derived from the DNS requests are in n-gram table 204 (e.g., seen by network scanner 202 in the incoming network traffic), comparator 208 will determine that the DNS request is a legitimate request. In such situations, comparator 208 may allow the DNS request to exit the network and contact the appropriate DNS server, such as DNS server 112.

If n-grams extracted from the DNS requests are not in n-gram table 204, comparator 208 may determine that the DNS request is suspicious (e.g., possibly associated with a covert DNS tunnel). In some embodiments, a DNS request is determined to be a legitimate request if a particular percentage or number of the n-grams extracted from the DNS request is in n-gram table 204. For example, if more than 50% of the n-grams extracted from a DNS request are not found in n-gram table 204, the DNS request may be determined to be a suspicious DNS request.

In some embodiments, comparator 208 adds n-grams from a DNS request that were not found in n-gram table 204 to suspicious domain table 210. Additionally, or alternatively, comparator 208 may add any other suitable information to suspicious domain table 210, such as, hostnames or domain names in the suspicious DNS request. For example, comparator 208 may add the entire hostname included in the suspicious DNS request, the parent domain name, or any suitable portion of the hostname to suspicious domain table 210. Suspicious domain table 210 may store and/or organize the information received from comparator 208 in any suitable manner, for example, in the same manner that n-gram table 204 indexes n-grams. Suspicious domain table 210 may be implemented using any suitable form of memory, for example, random-access memory, read-only memory, flash memory, or any other suitable form of memory.

If a suspicious hostname, domain name, and/or n-gram already exists in suspicious domain table 210, suspicious domain table 210 may increment a counter to indicate that the suspicious domain name, hostname, and/or n-gram has been seen more than once. If a counter is being used, comparator 208 may determine whether the counter has reached a detected covert DNS tunnel threshold. The detected covert DNS tunnel threshold may be any suitable number, for example, 1 or 100. If the counter has reached the threshold, covert DNS tunnel detector 200 may issue an alarm indicating that a suspected covert DNS tunnel has been detected and action may need to be taken. In some embodiments, when the counter has reached the threshold, comparator 208 blocks some or all DNS requests associated with the suspicious hostname and/or domain name from exiting the network. In some embodiments, none or only some DNS requests are blocked to avoid inconveniencing users when the domain name or hostname suspected of being associated with a covert DNS tunnel is based on false-positive suspicious DNS requests (e.g., DNS requests were incorrectly determined to be suspicious).

In some embodiments, no counter is used. Instead, action is taken when the first suspicious domain name, hostname, and/or n-gram is detected (e.g., issue an alarm or block respective DNS requests). In some embodiments, users may be alerted that their DNS requests are being blocked because the DNS requests are associated with a suspected covert DNS tunnel. For example, a message may be displayed in a user's web browser indicating that the last DNS request was blocked and the user should contact a network administrator.

In some embodiments, the counter is incremented by a weighted valued depending on a weight associated with a suspicious DNS request. For example, the size of a DNS request may indicate the likelihood that the DNS request is associated with a covert DNS tunnel. As a specific example, the counter may be incremented by a greater value when the size of the suspicious DNS request is of a greater size. Conversely, the counter may be incremented by a lesser value when the size of the suspicious DNS request is of a lesser or roughly average size. As another example, the weights associated with suspicious DNS requests may be associated with the value, average, and/or change in frequency, rarity, and/or age of the suspicious DNS request. For example, the more frequently a domain associated with suspicious DNS requests is seen, the greater the weight associated suspicious DNS requests for that domain. As a further example, a covert DNS tunnel may create short lived, but large bursts of DNS requests. As such, a domain associated with short lived, but large bursts of suspicious DNS requests may be associated with a larger weight than a domain associated with large amounts of suspicious DNS requests spread over a greater period of time. In some embodiments, the counts are associated with decay functions. For example, the value of the counters may decrease over time when associated suspicious DNS requests are not seen. In some embodiments, the decay functions change according to the weights discussed above. For example, counters may decay faster for domains with greater weights and slower for domains with smaller weights or vice versa. In some embodiments, the decay function is uniform across all entries in suspicious domain table 210.

In some embodiments, information regarding sources that generate suspicious DNS requests is stored in suspicious domain table 210. For example, source identifiers may be stored in suspicious domain table 210 and associated with the respective suspicious DNS requests the source generated. As a further example, covert DNS tunnel detector may include a table of suspicious sources that is independent of suspicious domain table 210. A source identifier may be an IP address, MAC address, user identification, or any other suitable identifier that identifies a source, such as, devices used by users 104 of FIG. 1. In this manner, covert DNS tunnel detector 200 may monitor from where suspicious DNS requests originate. If a particular source generates a number of suspicious DNS requests, covert DNS tunnel detector 200 may take suitable action, such as, issue an alert about the possible compromised source, block some or all outgoing and/or incoming communications related to the suspicious source, and/or incapacitate the suspicious source. A source may be deemed suspicious or compromised when the number of suspicious DNS requests that originate from the source meet or exceed a threshold or when the source attempts any communication with a domain that suspected of being associated with a covert DNS tunnel. For example, if a source transmits a single DNS request to a domain name determined to be suspicious by comparator 208, the source will be determined to be compromised. In some embodiments, a source may be deemed suspicious when a particular proportion of DNS requests that originate from a particular source are deemed suspicious. For example, when 5% of the total DNS requests that originate from a particular device are suspicious, then that particular device may be deemed a suspicious source. In some embodiments, all sources associated with suspicious DNS requests are deemed to be a suspicious source. For example, all sources that originated DNS requests associated with a suspected covert DNS tunnel may be deemed suspicious sources. In some embodiments, the user of a suspicious source may be alerted that the user's source has originated suspicious DNS requests and/or originated DNS requests associated with a suspected covert DNS tunnel.

In some embodiments, covert DNS tunnel detector 200 is implemented in a security system or multiple security systems dispersed throughout the network, wherein the security systems may be substantially similar to security system 106 of FIG. 1. In some embodiments, covert DNS tunnel detector 200 is implemented in devices used by users 104 in addition or alternative to the security systems. In some embodiments, some elements of covert DNS tunnel detector 200 are dispersed in the network while some elements remain centralized. For example, network scanner 202 may be implemented in devices used by users 104, but may send the extracted n-grams to a centralized n-gram table 204 for indexing and storage. In some embodiments, covert DNS tunnel detector 200 creates n-grams based on traffic from multiple networks. For example, network scanner 202 may be implemented in security systems in multiple networks. The number of false positives from comparator 208 may be reduced when n-grams created from multiple networks are utilized, Covert DNS tunnel detector 200 may be implemented using any suitable combination of hardware and/or software. For example, the elements shown in FIG. 2 may be implemented using one or more PLD, FPGA, microcontroller, ASIC, other firmware, or any suitable combination thereof. It should be noted that the elements shown in FIG. 2 may be removed, rearranged, and/or combined in any suitable fashion without departing from the disclosure. For example, comparator 208 and suspicious domain table 210 can combined such that suspicious domain table 210 is stored in comparator 208.

Figure 3:
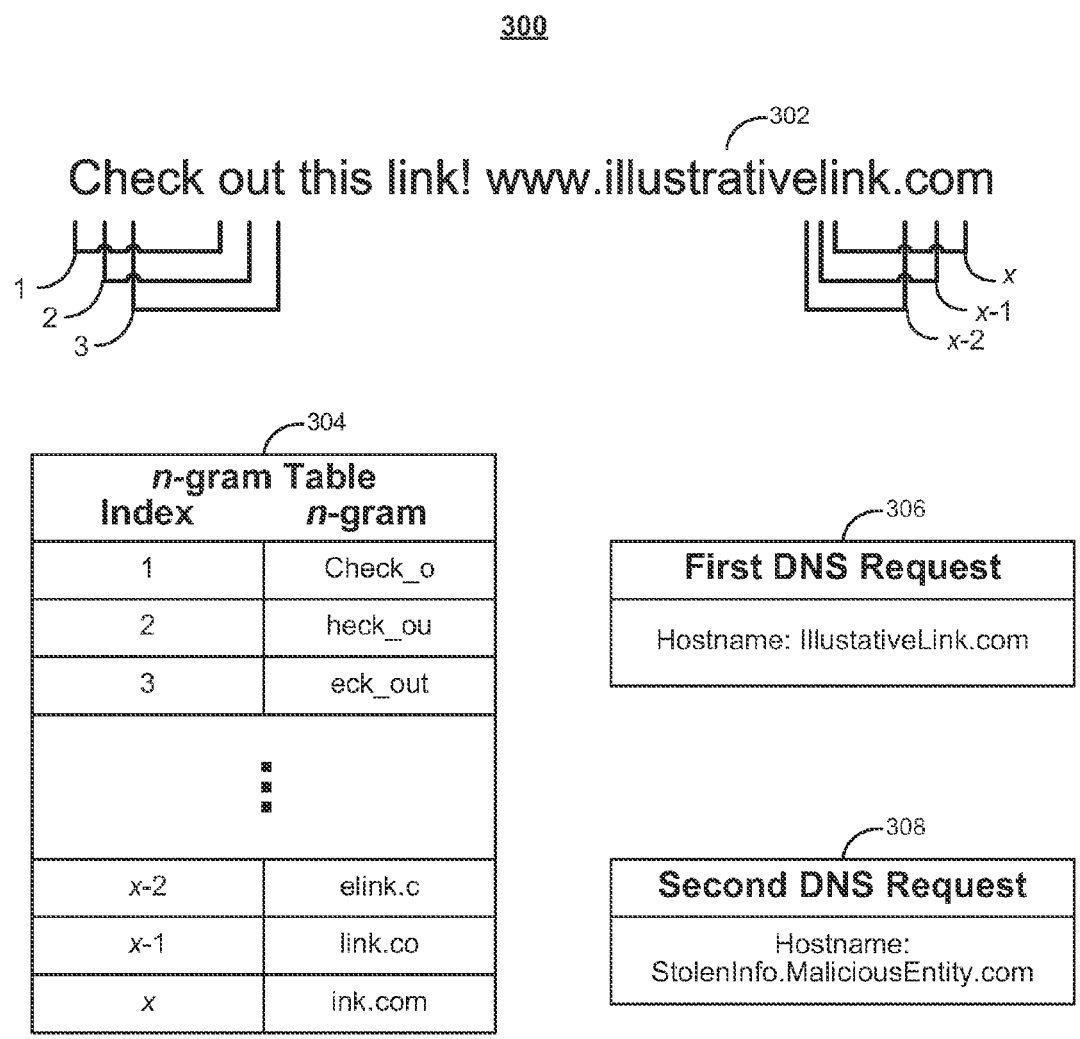
FIG. 3 is an example which depicts n-gram extraction from incoming network communications and comparison to outgoing DNS requests, according to an illustrative embodiment.

FIG. 3 shows illustrative example 300 which depicts n-gram extraction from incoming network communications and comparison to outgoing DNS requests. Such n-gram extraction and comparison may be completed by, for example, covert DNS tunnel detector 200 of FIG. 2. Illustrative example 300 includes illustrative incoming network communications 302, n-gram table 304, first DNS request 306, and second DNS request 308.

As an illustrative example, incoming network communications 302 includes text of character length x, where at least a portion of the communications 302 reads: 'check out this link! www.illustrativelink.com'. A network scanner, such as network scanner 202 of FIG. 2, may scan the text and extract n-grams based on the text as discussed above. For example, when n equals 7, the network scanner would create n-grams and store them in a table as shown in n-gram table 304. For illustrative purposes, spaces are shown in n-gram table 304 with an underscore. n-gram table 304 may be substantially similar to n-gram table 204 of FIG. 2.

As discussed above with regard to FIG. 2, in some embodiments, network scanner 202 only extracts n-grams based on character chains that match the syntax for hostnames. In such an example, scanner 202 will not create n-grams based on the 'Check out this link!' portion of incoming network communications 302 and only create n-grams based on a suitable section of the 'www.illustrativelink.com' portion of communications 302.

A DNS request inspector, such as DNS request inspector 206 of FIG. 2, may create n-grams based on the hostnames included in DNS requests when DNS requests are received. As an illustrative example, first DNS request 306 and second DNS request 308 are shown. In this example, first DNS request 306 includes a DNS request for hostname 'IllustrativeLink.com'. The DNS request inspector will extract n-grams based on this hostname. For example, the following example n-grams may be created when n equals 7:

TABLE 1

| Index | n-grams |
|-------|---------|
| y-2   | eLink.c |
| y-1   | Link.co |
| y     | ink.com |

Here, y is the character length of the hostname included in first DNS request 306. Once the DNS request inspector creates the n-grams, the inspector will send the n-grams to a comparator, such as comparator 208 of FIG. 2. The comparator will then compare the n-grams extracted from first DNS request 306 to n-grams in table 304, as discussed above with regard to comparator 208. In this example, at least some of the n-grams in table 304 are identical to the n-grams extracted from first DNS request 306 because both incoming network communications 302 and first DNS request 306 refer to the same domain name (i.e., 'IllustrativeLink.com'). In such embodiments, the DNS tunnel detector, such as covert DNS tunnel detector 200 of FIG. 2, may take no further action and allow first DNS request 306 to reach the appropriate DNS server.

As a further example, second DNS request 308 includes a request for hostname 'StolenInfo.MaliciousEntity.com'. As discussed above, the DNS request inspector will extract n-grams based on this hostname. For example, the following n-grams may be created when n equals 7:

TABLE 2

| Index | n-grams |
|---|---|
| z-2 | ntity.c |
| z-1 | tity.co |
| z | ity.com |

Here, z is the character length of the hostname included in second DNS request 308. As before, the DNS request inspector will send the n-grams extracted from second DNS request 308 to a comparator. However, in this example, the 'StolenInfo.MaliciousEntity' domain name was not in any of the incoming network communications scanned by the network scanner. As such, there would be no n-grams that match the hostname in second DNS request 308 in n-gram table 304. In such a situation, the comparator may send the n-grams to a suspicious domain table, such as suspicious domain table 210 of FIG. 2, block DNS requests associated with the 'MaliciousEntity' domain name, and/or issue an alert that the 'MaliciousEntity' domain name is associated with a suspected DNS tunnel, as discussed above with regard to FIG. 2.

In general, the 'StolenInfo' portion of the domain name in a DNS request associated with a covert DNS tunnel would encode the clandestine messages according to the covert DNS tunnel's encoding scheme. As such, the 'StolenInfo' portion of the domain name is likely to be unique across multiple DNS requests associated with a covert DNS tunnel. Accordingly, it is generally preferable to maintain records and/or counters pertaining to the parent domain name (e.g., 'MaliciousEntity') in the suspicious domain table, as opposed to the entirety of the domain name in the suspicious DNS request (e.g., 'StolenInfo.MaliciousEntity').

Figure 4:
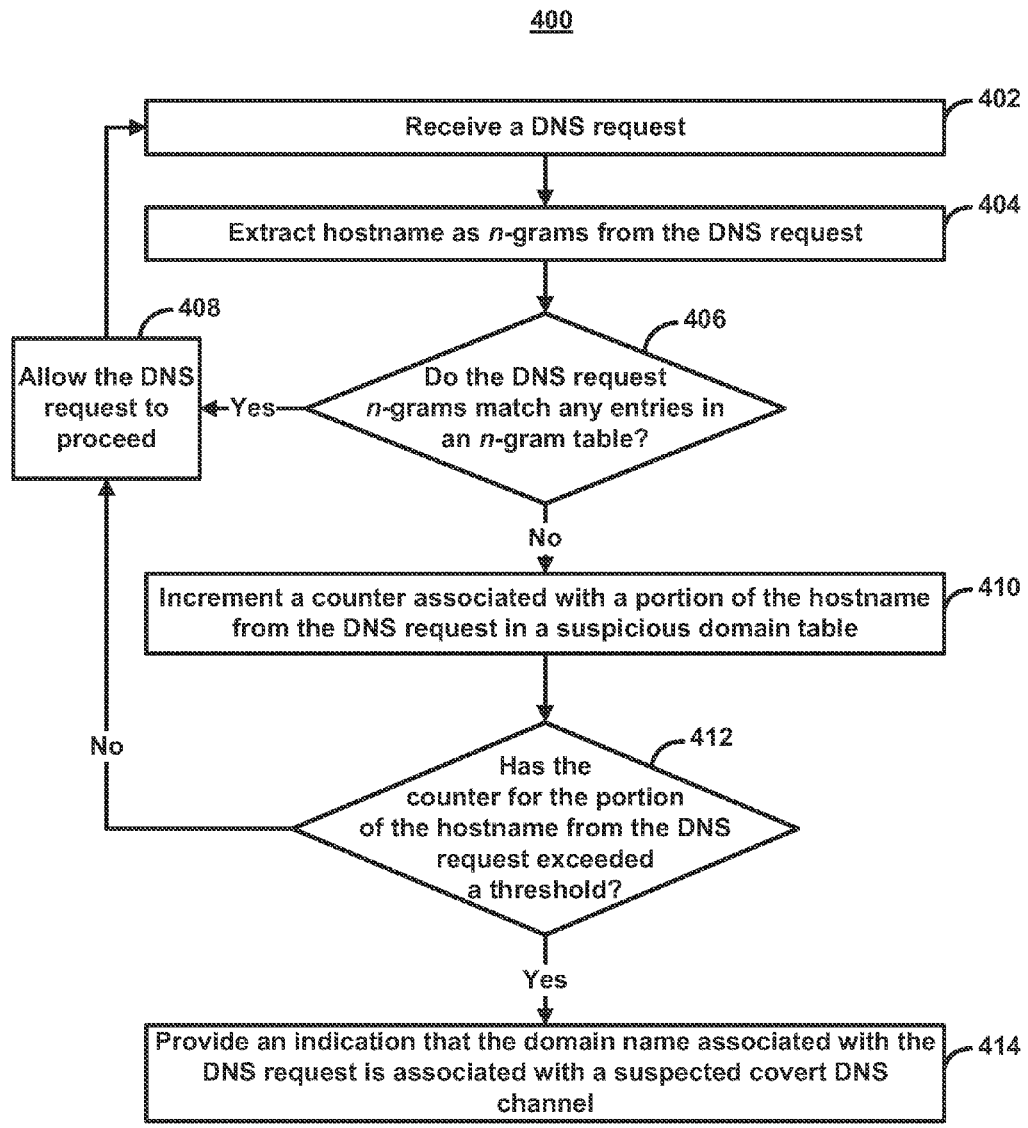
FIG. 4 is a flow chart of a method for determining whether a domain is associated with a covert DNS tunnel, according to an illustrative embodiment.

FIG. 4 shows illustrative process 400 for determining whether a domain is associated with a covert DNS tunnel. At step 402, a DNS request is received. For example, the DNS request may be received at covert DNS tunnel detector 200 of FIG. 2 from one of users 104 of FIG. 1. At step 404, the hostname is extracted from the DNS request in the form of an n-gram, for example, as described above with regard to DNS request inspector 206 of FIG. 2.

At step 406, it is determined whether the DNS request n-grams match any entries in an n-gram table. For example, the n-grams extracted from the received DNS request may be compared by comparator 208 to entries in n-gram table 204, as described above with regard to FIG. 2. If a sufficient number of matches are found, the DNS request is determined to be innocuous and process 400 proceeds to step 408. At step 408, the DNS request is allowed to proceed to the requested domain server and process 400 repeats with the next DNS request. If no matches are found, or not enough matches are found, process 400 proceeds to step 410.

At step 410, a counter associated with the domain name, hostname, and/or n-grams extracted from the DNS request is incremented in a suspicious domain table. As an example, and referring to the example described above with regard to FIG. 3, the 'StolenInfo.MaliciousEntity' hostname was not in any of the incoming network communications scanned by the network scanner. As such, some, if not all, of the n-grams extracted at step 404 from a DNS request to the 'StolenInfo.MaliciousEntity.com' hostname would not be found in an n-gram table at step 406. At step 410, a counter associated with 'MaliciousEntity.com' (e.g., the parent domain name associated with the suspicious DNS request) would be incremented in a suspicious domain table. The counter and the suspicious domain table may be substantially similar to the counters and suspicious domain table 210 as discussed above with regard to FIGS. 2 and 3. In some embodiments, the source which originated the DNS request may be added to the suspicious domain table and/or a counter associated with the source may be incremented, as discussed above with regard to FIG. 2.

At step 412, it is determined whether the counter has reached a threshold, for example, the detected covert DNS tunnel threshold as discussed above with regard to FIG. 2. If the counter has not reached the threshold, process 400 proceeds to step 408. If the counter has reached the threshold, process 400 proceeds to step 414. At step 414, the domain associated with the DNS request is deemed to be associated with a suspected covert DNS tunnel. At this point, an indication is provided that indicates that the domain name, hostname, and/or n-grams extracted from the DNS request are associated with a suspected covert DNS tunnel. For example, an alarm indicating that a suspected covert DNS tunnel has been detected may be issued and/or DNS requests associated with the domain name of the suspected covert DNS tunnel may be completely or partially blocked, as discussed above with regard to FIG. 2.

In practice, one or more steps shown in process 400 may be combined with other steps, performed in any suitable order, performed in parallel (e.g., simultaneously or substantially simultaneously), or removed. For example, in some embodiments, the detected covert DNS tunnel threshold may be 1. In such embodiments, steps 410 and 412 may be skipped such that no counter would be involved in the covert DNS tunnel determination. Process 400 may be implemented using any suitable combination of hardware and/or software in any suitable fashion.

The invention may be embodied in other specific forms without departing from the spirit or essential characteristics thereof. For example, the processes disclosed herein for detecting covert DNS tunnels may be equally applied to networks and/or systems of any suitable size and configured in any suitable manner. As a further example, the use of n-grams discussed herein may be substituted or used in conjunction with any other suitable method of extracting characters, words, sentences, or other information from incoming network communications and compared to the information extracted from DNS requests in any suitable manner. As a further example, in the embodiments described above, any reference to a hostname may be equally applicable to a domain name and vice versa. The foregoing embodiments are therefore to be considered in all respects illustrative, rather than limiting of the invention.

What is claimed is:

1. A method for detecting covert DNS tunnels, the method comprising:
   scanning incoming network traffic received at a user equipment using a network scanner;
   extracting a first plurality of n-grams from the scanned incoming network traffic;
   extracting a second plurality of n-grams from a DNS request outgoing from the user equipment;
   comparing the first plurality of n-grams to the second plurality of n-grams; and
   adding at least a portion of a domain name associated with the outgoing DNS request to a table of a suspicious domain names when at least a portion of the second plurality of n-grams does not match the first plurality of n-grams.

2. The method of claim 1, further comprising:
determining that the domain name added to the table of suspicious domains is associated with a covert DNS tunnel.

3. The method of claim 2, further comprising:
providing an indication that the domain name was determined to be associated with a covert DNS tunnel.

4. The method of claim 2, further comprising:
blocking DNS requests addressed to the domain name determined to be associated with a covert DNS tunnel.

5. The method of claim 1, wherein the portion of the second plurality of n-grams that does not match the first plurality of n-grams is equal to a predetermined proportion of the second plurality of n-grams extracted from the outgoing DNS request.

6. The method of claim 1, further comprising:
incrementing a counter associated with the portion of the domain name added to the table of suspicious domains for respective DNS requests when at least a portion of the extracted n-grams from the respective DNS requests do not match the first plurality of n-grams.

7. The method of claim 6, further comprising:
providing an indication that the domain name added to the table of suspicious domains is associated with a covert DNS tunnel when the counter associated with the domain name reaches a threshold value.

8. The method of claim 6, further comprising:
blocking DNS requests addressed to the domain name added to the table of suspicious domains when the counter associated with the domain name reaches a threshold value.

9. The method of claim 1, wherein the first plurality of n-grams is associated with a string that matches a syntax of hostnames.

10. The method of claim 1, wherein the first plurality of n-grams is associated with a higher priority when the first plurality of n-grams is associated with a string that matches a syntax of hostnames.

11. The method of claim 1, wherein the first plurality of n-grams is stored using hash coding.

12. The method of claim 1, wherein the first plurality of n-grams is stored using a Bloom filter.

13. The method of claim 1, wherein the incoming network traffic is uncompressed by the network scanner prior to extracting the first plurality of n-grams.

14. A covert DNS tunnel detector comprising:
a network scanner configured to:
scan incoming network traffic received at a user equipment; and
extract a first plurality of n-grams from the scanned incoming network traffic;
a DNS request inspector configured to extract a second plurality of n-grams from a DNS request outgoing from the user equipment;
a comparator configured to compare the first plurality of n-grams to the second plurality of n-grams; and
a suspicious domain table configured to store at least a portion of a domain name associated with the outgoing DNS request when at least a portion of the second plurality of n-grams does not match the first plurality of n-grams.

15. The covert DNS tunnel detector of claim 14, wherein the comparator is further configured to determine that the domain name stored in the suspicious domain table is associated with a covert DNS tunnel.

16. The covert DNS tunnel detector of claim 15, wherein the comparator is further configured to provide an indication that the domain name stored in the suspicious domain table was determined to be associated with a covert DNS tunnel.

17. The covert DNS tunnel detector of claim 15, wherein the comparator is further configured to block DNS requests addressed to the domain name determined to be associated with a covert DNS tunnel.

18. The covert DNS tunnel detector of claim 14, wherein the portion of the second plurality of n-grams that does not match the first plurality of n-grams is equal to a predetermined proportion of the second plurality of n-grams extracted from the outgoing DNS request.

19. The covert DNS tunnel detector of claim 14, wherein the suspicious domain table is further configured to increment a counter associated with the stored portion of the domain name for respective DNS requests when at least a portion of the extracted n-grams from the respective DNS requests do not match the first plurality of n-grams.

20. The covert DNS tunnel detector of claim 19, wherein the comparator is further configured to provide an indication that the stored domain name is associated with a covert DNS tunnel when the counter associated with the domain name reaches a threshold value.

21. The covert DNS tunnel detector of claim 19, wherein the comparator is further configured to block DNS requests addressed to the domain name added to the table of suspicious domains when the counter associated with the domain name reaches a threshold value.

22. The covert DNS tunnel detector of claim 14, wherein the first plurality of n-grams is associated with a string that matches a syntax of hostnames.

23. The covert DNS tunnel detector of claim 14, wherein the first plurality of n-grams is associated with a higher priority when the first plurality of n-grams is associated with a string that matches a syntax of hostnames.

24. The covert DNS tunnel detector of claim 14, further comprising an n-gram table configured to store the first plurality of n-grams using hash coding.

25. The covert DNS tunnel detector of claim 14, further comprising an n-gram table configured to store the first plurality of n-grams using Bloom filter.

26. The covert DNS tunnel detector of claim 14, wherein the network scanner is further configured to uncompress the incoming network traffic prior to extracting the first plurality of n-grams.

27. A non-transitory computer readable medium storing computer executable instructions, which, when executed by a processor, cause the processor to carryout a method for detecting covert DNS tunnels, the computer readable medium comprising:
scanning incoming network traffic received at a user equipment using a network scanner;
extracting a first plurality of n-grams from the scanned incoming network traffic;
extracting a second plurality of n-grams from a DNS request outgoing from the user equipment;
comparing the first plurality of n-grams to the second plurality of n-grams; and
adding at least a portion of a domain name associated with the outgoing DNS request to a table of a suspicious domain names when at least a portion of the second plurality of n-grams does not match the first plurality of n-grams.

* * * * *